(12) United States Patent
Aschauer

(10) Patent No.: US 6,880,679 B2
(45) Date of Patent: Apr. 19, 2005

(54) INTERLEAVED MULTI-DISC FRICTION DEVICE USING A FAN TO GENERATE A VAPOROUS AIR/OIL MIXTURE FOR COOLING MEANS

(76) Inventor: George Reisch Aschauer, 2214 Red Oak Ct. NE., Bemidji, MN (US) 56601

( * ) Notice: Subject to any disclaimer, the term of this patent is extended or adjusted under 35 U.S.C. 154(b) by 15 days.

(21) Appl. No.: 10/303,612

(22) Filed: Nov. 25, 2002

(65) Prior Publication Data
US 2004/0099489 A1 May 27, 2004

(51) Int. Cl.⁷ ............................................. F16D 55/02
(52) U.S. Cl. ............................. 188/71.6; 188/264 CC; 188/264 P
(58) Field of Search ........................... 188/71.6, 264 R, 188/264 D, 264 F, 264 CC, 264 P, 264 DD; 192/70.12

(56) References Cited

U.S. PATENT DOCUMENTS

| | | | | |
|---|---|---|---|---|
| 2,711,802 A | * | 6/1955 | Davis | 188/264 D |
| 2,790,518 A | * | 4/1957 | Wilson | 188/264 D |
| 3,661,238 A | * | 5/1972 | Davies | 192/70.12 |
| 3,924,712 A | * | 12/1975 | Stirling et al. | 188/264 F |
| 4,010,827 A | * | 3/1977 | Ellis et al. | 188/264 F |
| 4,431,091 A | * | 2/1984 | Scibbe | 188/264 F |
| 4,488,626 A | * | 12/1984 | Handke | 192/70.12 |
| 4,828,089 A | * | 5/1989 | Collins et al. | 192/70.12 |
| 6,355,996 B1 | * | 3/2002 | Birkestrand | 310/54 |

* cited by examiner

Primary Examiner—Thomas Williams

(57) ABSTRACT

An interleaved friction plate device in which the plates can be clampingly engaged to synchronize, accelerate or decelerate a load, means for cooling and lubricating the surfaces of the friction plates which includes a centrifugal fan that acts as a support and drive for the friction discs and discharges a vaporous air/oil mix uniformly through a multiple plate stack, to more completely cool and lubricate the friction surfaces.

1 Claim, 2 Drawing Sheets

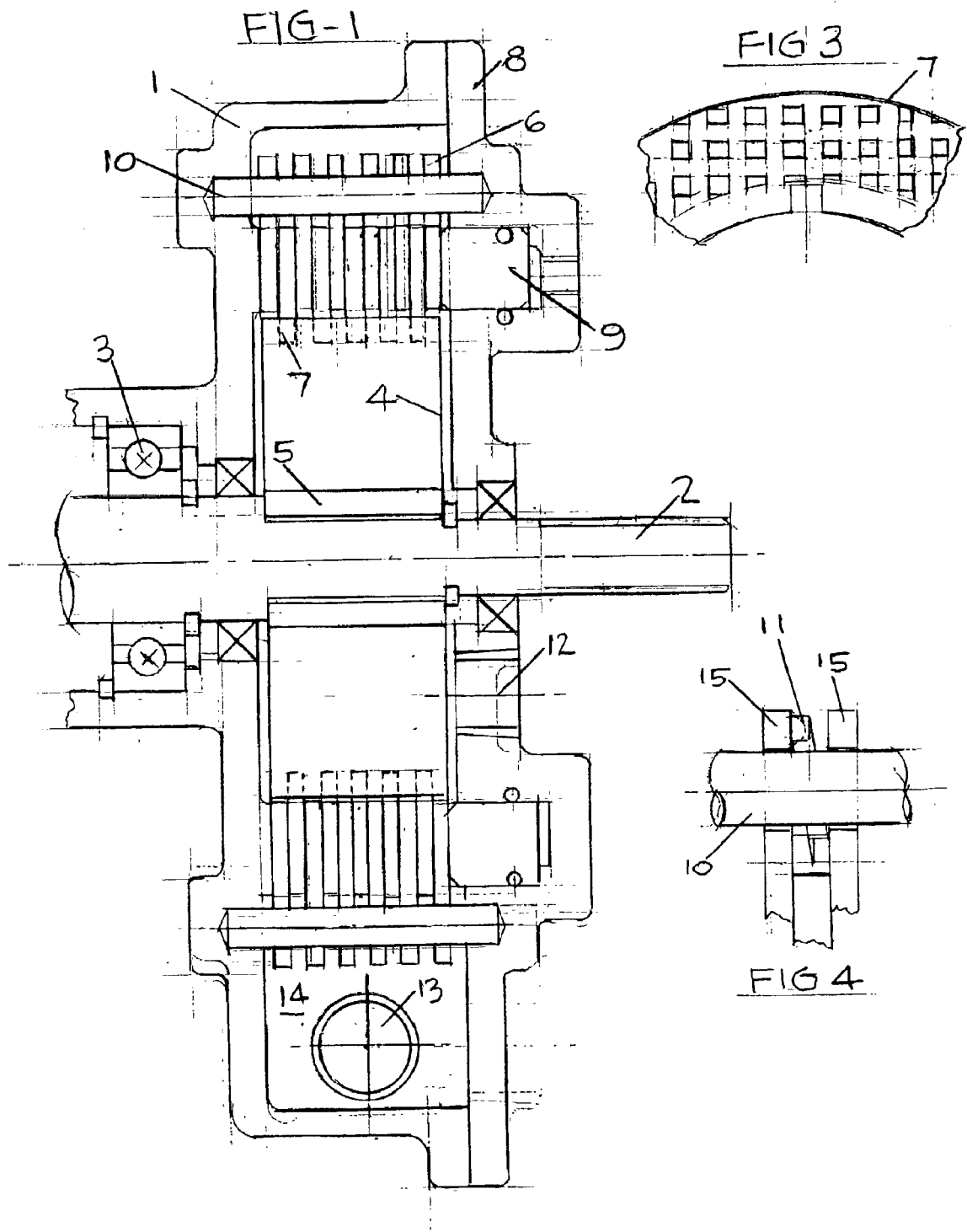

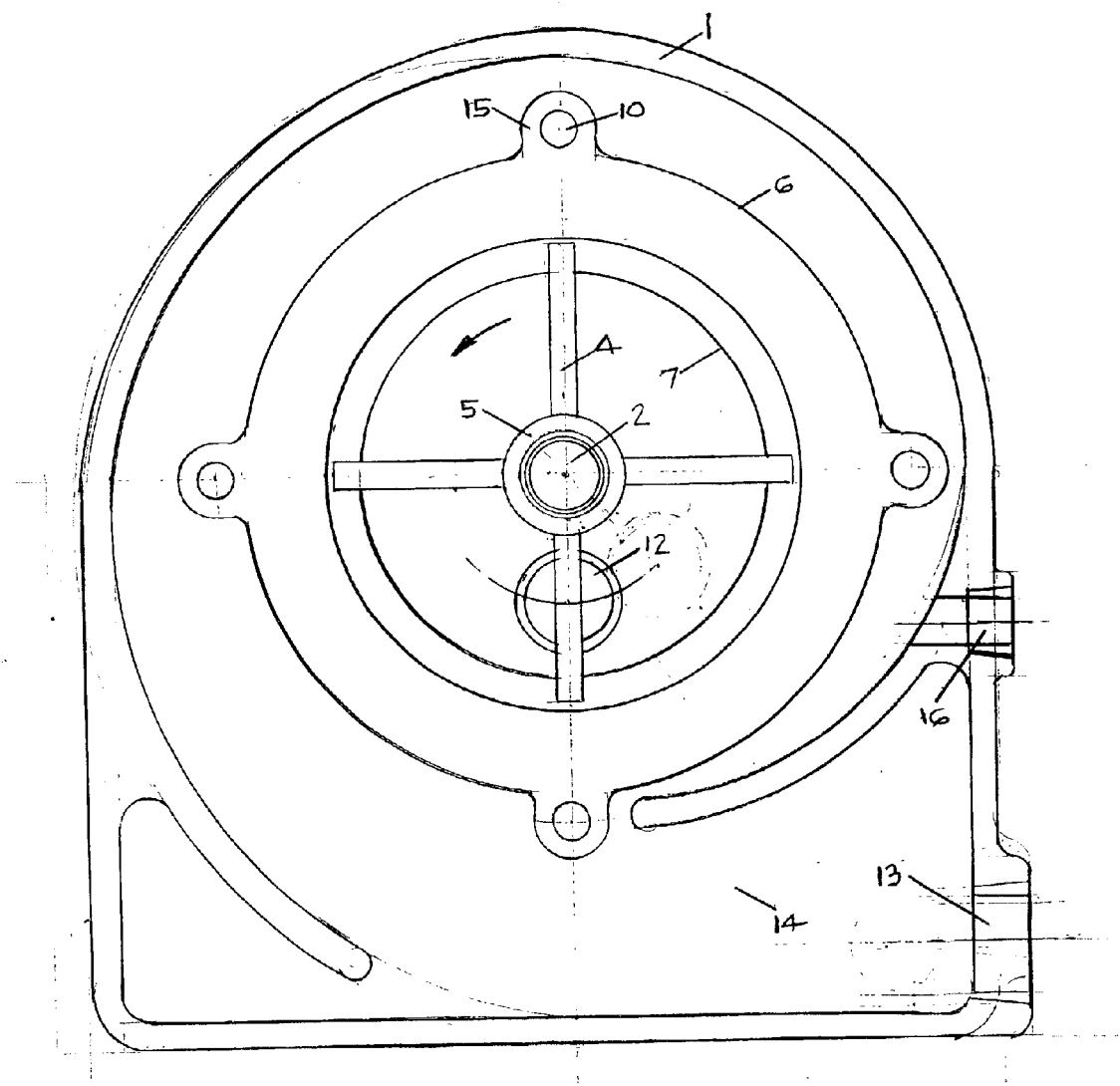

INTERLEAVED MULTI-DISC FRICTION DEVICE USING A FAN TO GENERATE A VAPOROUS AIR/OIL MIXTURE FOR COOLING MEANS

BACKGROUND OF THE INVENTION

Various types of interleaved friction plate brakes or clutches cooling means have been proposed and used with certain degrees of success.

It has been determined that a given oil flow per minute per facing square inch can sustain a certain BTU per square inch per second for a certain time before threshold damage occurs. The assumption is that gross plate area receives uniform cooling, probably achieved only in a single plate laboratory test apparatus setup. Many prior art structures disclose a series of radially extending hole passages in the plate supporting hub which act more or less haphazardly to feed cooling fluid to the plate stack. Since the plates may become located at random locations with respect to the hubs radial holes, oil does not flow uniformly across the plate surfaces, (for example, U.S. Pat. No. 3,833,100 Aschauer FIG. 1).

There is evidence that plate hot spots precede failure and may be only on a certain plate in the stack, possibly because of diminished cooling oil flow at this location by a restricted radial oil flow passage or by "path of least resistance" flow choice Uniform distribution of fluid across the plates may be achieved by excess quantities of oil; however, this is not economical and presents other problems such as released drag loss.

Most friction plate designs specify a grooved friction material surface operating against a flat smooth steel surface. Oil flow emanates outward from the inside diameter of the grooved plate. This peripheral circumference is made up of grooves and solid lands. The number of grooves, width of groove, and depth of groove defines available flow area.

This area times pressure, largely generated by centrifugal force, dictates oil flow. Pressure is usually low. Temperature rise in the oil as it passes between the mating surfaces carries away the heat of engagement.

Cooling flow for a vaporous air/oil mix is substantially different and greater than for oil for the same peripheral area (since the low density air/oil cooling medium more completely flows to all areas of the friction surface and absorbs energy by gas expansion as well as conductivity and oil particle vaporization.

The latent heat of vaporization can absorb heat energy and can be greater for vaporous air/oil than solid oil.

SUMMARY OF THE PRESENT INVENTION

The salient point of the invention is the use of an air/oil vaporous mix to carry away heat generated by frictional engagement. The design presented provides an independent unit containing its own means for cooling circulation and sump.

A centrifugal fan generates pressure and flow and acts as a support and drive for the rotating frictional elements, discharging through the friction plate stack. The fan outside diameter is sized by the inside diameter of the friction plates, and its length by the plate stack height. The result is a fan with a theoretical discharge capacity greater than required plate cooling capacity needed, however, the fan discharge operates at near the "shut off point" for both the released and engaged conditions.

Other means of introducing oil to the fan may be used such as an oil jet at a logical location.

DESCRIPTION OF THE DRAWINGS

FIG. 1 is a longitudinal cross-sectional view through a brake embodying the present invention.

FIG. 2 is a averse sectional view through the friction disc stack and centrifugal fan.

FIG. 3 is a fragmentary view of typical friction disc surface grooving passages providing outward cooling flow.

FIG. 4 is a fragmentary view including means for piston disengagement and separation for the spacer plates mating with the fiction discs.

DESCRIPTION OF THE INVENTION FIGS. 1 AND 2

Referring to FIG. 1 it is preferable to mount a brake as shown ahead of the final drive, as speed is higher and torque is lower. Energy absorbed by the brake is the same regardless of the location selected.

Stationary housing 1 shown integral with the final drive housing acts to support drive shaft 2 through bearing 3. Drive shaft 2 is part of the vehicle drive shaft train.

Centrifugal fan blades 4 are attached integrally to hub 5 which is splined to shaft 2 in the conventional manner.

The centrifugal fan impeller made up of blades 4 and hub 5 is surrounded by confining elements creating a pressure chamber. The inside diameter of the plate stack becomes the outer diameter of the chamber with stationary cover 8 housing 1 providing close fitting side walls. Shaft 2 provides the annular chamber inside diameter.

Interleaved spacer plates 6 and friction plates 7 make up a friction plate stack package. Stationary cover 8 is sealably attached to housing 1 and provides a pressure chamber for a conventional engaging piston 9; with cover 8 and housing 1 also acting as close fitting side walls forming the centrifugal fan pressure chamber along with shaft 1 at the inside and the friction plate stack at the outside.

Stationary pins 10 are supported at one end by housing 1 and at the other end by cover 8.

FIG. 4 shows individual spring coils 11 that surround pins 10 and act to disengage or release piston 9 and separate spacer plates 6.

Fan inlet suction port 12 draws cooling medium from sump 14 through port 13. An external hose or pipe line passage (not shown) connects port 13 to port 12. An air/oil to ambient air heat exchanger may be interposed between ports 13 and 12 as needed to dissipate heat of engagements.

The centrifugal fan blades 4 acting as keys fit loosely into slots of the friction plates to provide a slidable connection drive.

The spacer plates 6 have external lugs 15 with holes that fit loosely on pins 10 to provide a slidable connection braking resistance when the braking cylinder pressure is applied.

Housing 1 has a spiral, scroll or volute shape commonly used with fans or pumps, becoming progressively increasing toward sump 14 and port 13 converting dynamic energy into static pressure.

Port 16 connects to an atmospheric breather conduit.

Operational Sequences

When the vehicle is in drive mode the brake is released. Centrifugal fan blades 4 discharge an air/oil mix through the released interleaved plate stack, outwardly against the stationary voluted housing wall 1, tending to separate the heavier component toward the sump.

The straight fan blades shown may be different in numbers or curve shaped. During the braking mode fan discharge passes between the interleaved plates via the grooved passages. More complete cooling of all friction surfaces is achieved. FIG. 3 purposely exhibits a small friction area to gross area which may be substantially increased using an air/oil vaporous mix to improve friction wear life and economy of manufacture.

I claim:

1. An interleaved friction plate device in which the plates can be clampingly engaged to synchronize, accelerate, or decelerate a load, means for cooling and lubricating the surfaces of the friction discs which includes a driven centrifugal fan enclosed in a confined annular chamber bounded by the plate stack inside diameter as its outside, the drive shaft at the chamber inside, and the engaging and resisting side walls adjacent to the plate stack defining the chamber side walls, the confining fan acting as a support and drive for the friction discs and discharging a vaporous air/oil mix uniformly thru the friction plate stack.

* * * * *